Nov. 10, 1925.
R. G. CASEY
VISCOMETER
Filed Nov. 13, 1923
1,560,662
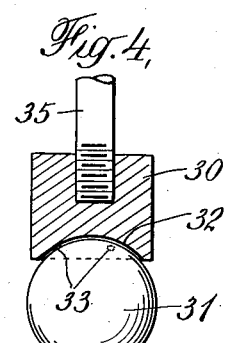
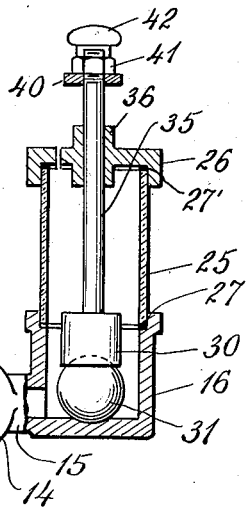
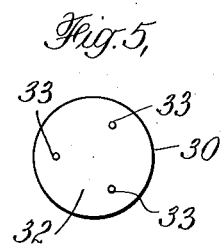
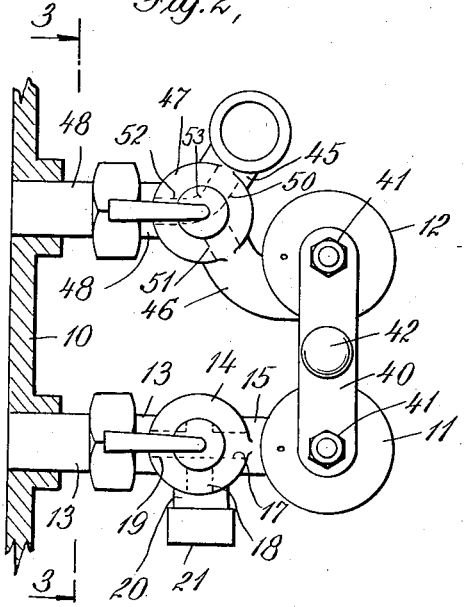
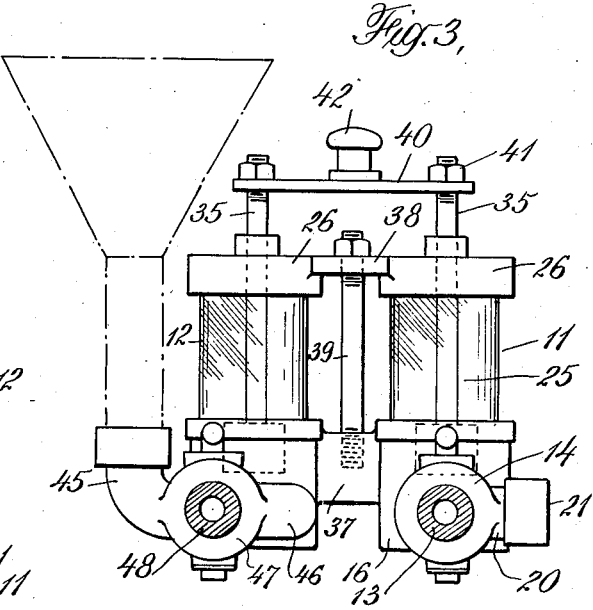
INVENTOR
Richard G. Casey
BY
E. W. Marshall
ATTORNEY Patented Nov. 10, 1925.

1,560,662

UNITED STATES PATENT OFFICE.

RICHARD G. CASEY, OF MELBOURNE, VICTORIA, AUSTRALIA, ASSIGNOR TO ANTHONY G. M. MITCHELL, OF MELBOURNE, AUSTRALIA.

VISCOMETER.

Application filed November 13, 1923. Serial No. 674,438.

*To all whom it may concern:*

Be it known that I, RICHARD G. CASEY, a subject of the King of Great Britain, and a resident of Melbourne, Australia, have invented certain new and useful Improvements in Viscometers, of which the following is a specification.

This invention relates to devices for determining the viscosity of liquids.

The invention has been more particularly worked out for the purpose of determining the viscosity of lubricating oils used in engines. It is well known that the lubricating oils in engines, particularly of the internal combustion type, become thin through dilution as the oil is used and it is necessary to drain off and renew oil periodically. Often the oil is drawn off when it is still fit for use and at other times, the oil is not drawn and renewed when it should be, due to the fact that no simple and practical means has heretofore been provided for testing the oil.

This invention has for its salient object to provide simple and practical means for easily and quickly determining the viscosity of liquids.

Another object of the invention is to provide means whereby the viscosity of the lubricating oil in use in an engine or other machine can be readily compared with a known standard.

Another object of the invention is to provide means connected to the oil sump of an engine or machine for testing the oil without necessitating the draining of the oil from the sump.

Further objects of the invention will appear from the following specification taken in connection with the drawings, which form a part of this application, and in which—

Fig. 1 is a sectional elevation showing a portion of an oil sump having mounted thereon a device for testing the viscosity of the oil.

Fig. 2 is a top plan view of the construction shown in Fig. 1, the casing and oil sump being shown in section.

Fig. 3 is a sectional elevation taken substantially on line 3—3 of Fig. 2.

Fig. 4 is a sectional elevation showing the testing elements, and

Fig. 5 is a bottom plan view of one of the testing elements.

The invention briefly described consists of a device mounted on the oil sump casing and adapted to communicate therewith. This device is connected by a conduit to the oil sump and through this conduit receives a sample of the oil in the sump. Elements are provided in the device for testing the viscosity of this oil. These elements have interfitting surfaces adapted to receive between them a film of oil and the elements may be lifted in the device and the time required for the separation of the elements due to the action of gravity on one of them can be determined. A single device such as that just described may be used, but in the particular embodiment of the invention shown there is illustrated a pair of such devices simultaneously operable. One of these devices is adapted to communicate only with the oil sump, but the other device is mounted in conjunction with the oil inlet pipe through which new oil is conducted to the sump casing. This latter device, therefore, is adapted to receive a sample of the fresh oil when this oil is poured into the filling tube. This device can then be shut off from the oil sump and the used oil can be compared with the fresh oil to determine the state of deterioration of the used oil. Further details of the invention will appear from the following description.

Referring to the drawings, the testing device is mounted on the oil sump casing 10 which may form a part of an internal combustion engine or other machine.

In the particular embodiment of the invention illustrated, the viscosity testing apparatus comprises a pair of devices 11 and 12.

The device 11 is connected to the oil sump by a conduit 13 which communicates with a valve casing 14 connected at 15 to the cup-shaped base 16 of the testing device. The valve casing 14 has mounted therein a three-way valve having passages 17, 18 and 19 adapted to communicate respectively with conduits 15, 20 and 13. A plug 21 closes the end of the conduit 20 and may be removed, if desired, to drain off the oil from the oil sump.

The cup-shaped base 16 of the testing device 11 has superimposed thereon a cylindrical glass tube 25, the upper end of which is closed by a cap 26. Packing 27 may be interposed between the ends of the tube 25 and the base 16 and cap 26.

The means for testing the viscosity of the oil or other liquid comprises in the particular form of the invention shown, two parts having closely fitting surfaces, such as a cup 30 and ball 31. The cup as shown in Fig. 4 has a concave surface 32 corresponding in curvature to the curvature of the ball 31. The concave surface 32 has formed thereon a plurality of slight projections 33 preferably located at the angles of an equilateral triangle. These projections may be one or two millimeters in diameter and they may project from the concave surface to the extent of about one hundredth of a millimeter in the case of a viscometer to be used for ordinary lubricating oils. This form of testing means is disclosed in Patent #1,398,878, Michell, November 29, 1921.

A rod or pin 35 is secured to the cup 30 and projects upwardly through a bearing 36 in the cap 26.

The testing devices 11 and 12 are exactly the same in construction and, therefore, the foregoing description applies equally well to the device 12 and this device will not be specifically described.

The two testing devices are regidly connected together by a connecting web 37 and the caps 26 of the two devices are also connected together by a web 38, this web in turn being secured to the web 37 by a bolt 39.

The rods or pins 35 of the two testing devices are connected by a cross bar 40 which is secured on the rods by nuts 41 and a handle 42 is mounted on the bar 40 for the purpose of facilitating the manipulation of the rods.

The testing device 12 is mounted in conjunction with the filling tube or conduit 45 through which new oil is conducted to the oil sump. The conduit 45 and a conduit 46 are both connected to and communicate with a valve casing 47 which in turn is connected by a conduit 48 to the oil sump. The valve casing has three outlets 50, 51 and 52 and the valve has a passage 53 therein. When the valve is in the position shown in Fig. 2, communication is established through the conduits 45 and 48 and the sump can be filled.

A sample of the oil can be admitted to the chamber of device 12 by turning the valve to a position connecting conduits 45 and 46.

When the valve is turned to an intermediate position all the outlets of the valve casing will be closed.

The testing devices above described operated as follows. In the first place it is obvious that the single testing device 11 could be used alone to test the viscosity of the used oil. The receptacle formed by the base 16, tube 25 and cap 26 of the device 11 can communicate, when a sample is to be taken, with the oil sump and, therefore, the oil in the device is used oil. This oil can be drained off by removing the plug 21. In order to test this oil, the rod 35 and cup 30 are lifted and the ball 31 will be lifted with the cup due to the film of oil between the under surface 32 of the cup and the surface of the ball. The operator by observing through the glass tube 25 can determine the length of time required for the ball to separate from the cup. This time can be compared with the time required for the separation when the device is used with new oil of the grade utilized in the engine or machine provided a schedule is furnished by the engine manufacturer or oil company, However, by the combination of devices 11 and 12 such a comparison can be easily and quickly made at any time by the engine or machine user. When the two devices are mounted on the oil sump casing, the device 11 is used in the manner just described.

The receptacle of the testing device 12 is filled or provided with fresh oil when this oil is placed in the oil sump through the filling conduit 45. The three-way valve mounted in the casing 47 is then turned so that all three of the conduits 45, 46 and 48 are closed and the fresh oil is then confined in the chamber of the testing device 12.

Pressure is then exerted on the handle 42 to cause the balls to adhere to the cups due to the film of oil. The tester can now lift the handle 42, thereby raising both rods, cups and balls. By observing the time required for the separation of the two balls from their respective cups, the tester can easily and quickly determine the state of deterioration of the used oil.

The temperatures of the two liquids or oils need not be considered since because of the location of the testing devices in such close proximity, both oils will be approximately at the same temperature. The engine or machine maker can furnish information as to when the oil should be drained. For instance, it can be specified that when the first ball separates from its cup in less than half the time required for the second, the oil should be drained and renewed. The ball in the device 11 will, of course, separate from its cup sooner than the ball in the other device since the oil in the device 11 is thinner than the fresh oil.

It will, of course, be obvious that it is not necessary that the chambers of the testing devices be filled with oil since all that is required for the test is a film of oil between the ball and cup.

From the foregoing description, it will be seen that simple and practical means has been provided for testing the viscosity of liquids and, particularly, the viscosity of the lubricating oil in a machine or engine.

Furthermore, by means of the structure described, the viscosity of the used oil can be easily and quickly compared with the viscosity of fresh oil of the grade utilized.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A device for testing the viscosity of liquids comprising a closed transparent receptacle, a conduit for conducting liquid thereto and a pair of separable elements in said receptacle having interfitting surfaces adapted to receive between them a film of liquid to be tested, and means extending through and to a position outside said receptacle for lifting one of said elements.

2. In combination, a casing having an oil sump, a pair of receptacles, each communicating with said sump, a liquid inlet conduit communicating with one of said receptacles and with the oil sump, and means in each receptacle for testing the viscosity of the oil therein whereby a comparison may be had between the fresh oil and used oil.

3. In combination, a casing having an oil sump, a pair of receptacles each communicating with said sump, a liquid inlet conduit communicating with one of said receptacles and with the oil sump, and means in each receptacle for testing the viscosity of the oil therein whereby a comparison may be had between the fresh oil and used oil, and a control valve between each receptacle and the sump whereby the passages therebetween can be closed.

4. In combination with an oil sump casing, a filling conduit, a device for testing the viscosity of oil having a chamber communicating with said filling conduit, a viscosity testing device having a chamber communicating with the oil sump, and means for operating said testing devices, said chambers being located in proximity to each other so that the tests in both chambers can be simultaneously observed.

5. In combination with an oil sump casing, a filling conduit therefor, a device for testing the viscosity of oil having a chamber communicating with said filling conduit, a viscosity testing device having a chamber communicating with the oil sump, and means for simultaneously operating said testing devices.

6. In combination with an oil sump casing, a filling conduit communicating therewith, a device for testing the viscosity of oil having a chamber communicating with said filling conduit, a viscosity testing device having a chamber communicating with the oil sump, and means for operating said testing devices, each of said testing devices comprising a pair of separable elements having closely fitting surfaces adapted to receive between them a film of oil.

7. In combination with an oil sump casing, a filling conduit, a device for testing the viscosity of oil having a chamber communicating with said filling conduit, a valve for controlling the communication between said chamber, filling conduit and sump casing, a viscosity testing device having a chamber communicating with the oil sump, and means for operating said testing devices.

8. In combination with an oil sump casing, a filling conduit, a device for testing the viscosity of oil having a chamber communicating with said filling conduit, a three-way valve for controlling the communication between said chamber, filling conduit and sump casing, a viscosity testing device having a chamber communicating with the oil sump, and means for operating said testing devices.

9. In combination with an oil sump casing, a filling conduit, a device for testing the viscosity of oil having a chamber communicating with said filling conduit, a valve for controlling the communication between said chamber, filling conduit and sump casing, a viscosity testing device having a chamber communicating with the oil sump, a valve controlling the communication between said second testing device and the sump casing, and means for operating said testing devices.

10. In combination with an oil sump casing, a filling conduit, a device for testing the viscosity of oil having a chamber communicating with said filling conduit, a valve for controlling the communication between said chamber, filling conduit and sump casing, a viscosity testing device having a chamber communicating with the oil sump, a valve controlling the communication between said second testing device and the sump casing, and means for simultaneously operating said testing devices.

11. In combination with an oil sump casing, a filling conduit, a device for testing the viscosity of oil having a chamber communicating with said filling conduit, a valve for controlling the communication between said chamber, filling conduit and sump casing, a viscosity testing device having a chamber communicating with the oil sump, a valve controlling the communication between said second testing device and the sump casing, and means for simultaneously operating said testing devices, each of said testing devices comprising a pair of separable elements having closely fitting surfaces adapted to receive between them a film of oil.

12. In combination with an oil sump casing, a filling conduit, a device for testing the viscosity of oil having a chamber communicating with said filling conduit, a viscosity testing device having a chamber communicating with the oil sump, and means for operating said testing devices, said chambers having transparent portions through which can be observed the action therein.

13. In combination, an oil sump, a pair of simultaneously operable viscosity testing devices including means in each device for testing the oil therein, one device communicating with the oil sump and the other device having a connection for receiving fresh oil.

14. In combination, an oil sump, a pair of simultaneously operable viscosity testing devices including means in each device for testing the oil therein, one device communicating with the oil sump and the other device having a connection for receiving fresh oil, said devices having transparent portions through which the action therein can be observed.

15. In combination, an oil sump, a pair of viscosity testing devices including means in each device for testing the oil therein, one device communicating with the oil sump and the other device having a connection for receiving fresh oil, and means for simultaneously operating said testing devices.

16. In combination, an oil sump, a pair of viscosity testing devices arranged side by side and including means in each device for testing the oil therein, one device communicating with the oil sump and the other device having a connection for receiving fresh oil.

17. In combination, an oil sump, a pair of viscosity testing devices arranged side by side and including means in each device for testing the oil therein, one device communicating with the oil sump and the other device having a connection for receiving fresh oil, said devices having transparent portions through which the action therein can be observed.

18. In combination, a casing having an oil sump, a testing device mounted thereon having a chamber communicating with the sump, and having means in the chamber for testing the viscosity of the oil therein, a second chamber arranged side by side with the first chamber and adapted to receive fresh oil for testing, and means in said second chamber for testing the oil therein.

19. In combination, a casing having an oil sump, a pair of receptacles mounted thereon, one of said receptacles communicating with the sump and the other receptacle being adapted to receive fresh oil and means for simultaneously making comparative tests of the oil in the two receptacles.

In witness whereof, I have hereunto set my hand this ninth day of November, 1923.

RICHARD G. CASEY.